US006419260B1

(12) United States Patent
Kuroda

(10) Patent No.: US 6,419,260 B1
(45) Date of Patent: Jul. 16, 2002

(54) WHEELCHAIR

(76) Inventor: Shigeru Kuroda, 551-15, Nakahara, Shizuoka-shi, Shizuoka-ken (JP)

( * ) Notice: Subject to any disclaimer, the term of this patent is extended or adjusted under 35 U.S.C. 154(b) by 0 days.

(21) Appl. No.: 09/758,279

(22) Filed: Jan. 12, 2001

(30) Foreign Application Priority Data

Sep. 29, 2000 (JP) ....................................... 2000-298716

(51) Int. Cl.[7] ................................................ B62B 7/10

(52) U.S. Cl. ..................... 280/647; 280/638; 280/304.1

(58) Field of Search ........................... 280/250.1, 281.1, 280/287, 278, 304.1, 43, 43.17, 43.21, 650, 642, 643, 648, 288.4, 639, 646, 42, 647, 638

(56) References Cited

U.S. PATENT DOCUMENTS 3,901,527 A * 8/1975 Danziger et al. ........... 280/638
4,515,385 A * 5/1985 Christian ................. 280/304.1
4,542,918 A * 9/1985 Singleton .................... 280/650
4,809,998 A * 3/1989 Girvin ..................... 280/250.1
5,244,223 A * 9/1993 Uchiyama ................ 280/250.1
5,613,697 A * 3/1997 Johnson ................... 280/250.1
5,727,809 A * 3/1998 Ordelman et al. .......... 280/650
6,161,856 A * 12/2000 Peterson .................. 280/250.1

FOREIGN PATENT DOCUMENTS

JP 409308650 A * 12/1997

* cited by examiner

*Primary Examiner*—Brian L. Johnson
*Assistant Examiner*—Daniel Yeagley
(74) *Attorney, Agent, or Firm*—Harrison & Egbert

(57) ABSTRACT

A wheelchair easy to move it wherein the burden imposed both on the user of the wheelchair and on a person who helps him is remarkably reduced. The wheelchair a chair body 5 with a seat 1 and armrests 3*a*, 3*b*, right and left large wheels 7*a*, 7*b* provided on right and left sides of the chair body, right and left front casters 9*a*, 9*b* provided in front of the chair body, each of the front casters being adapted to turn in different horizontal directions. The chair body is provided at the rear thereof with right and left rear casters 21*a*, 21*b*, each of the rear casters being adapted to turn in different horizontal directions, the position of each of the rear casters being vertically adjustable. The position of each of the large wheels is adjustable forward and backward.

3 Claims, 7 Drawing Sheets

WHEELCHAIR

BACKGROUND OF THE INVENTION (1) Field of the Invention

The present invention relates to a wheelchair.

(2) Description of the Related Art

A conventional wheelchair comprises a chair body with a seat and armrests, right and left large wheels provided on right and left sides of said chair body, right and left front casters provided in front of said chair body, each of said front casters being adapted to turn in different horizontal directions.

However, the conventional wheelchair has the following disadvantages:

(A) When a user of the wheelchair is to move from the wheelchair to a bed, a chair, a toilet seat, a car seat, etc. (These will hereinafter be referred to as "bed, etc."), he has to lift himself from the wheelchair and get up on his feet. Also, when he is to move from the bed, etc. to the wheelchair, he has to lift himself from the bed, etc. and get up on his feet. Such movements will impose a heavy burden not only on the user of the wheelchair but also on a person who helps him because it is impossible or difficult for the user of the wheelchair to walk. The burden will be very severe particularly when the user of the wheelchair is heavy and the helper is weak.

(B) Even when there is a small difference in floor height, a small projection, a small hole or any other small obstacle on the floor, the wheelchair may not be able to move across the obstacle because the front casters cannot get over the obstacle. Therefore, the wheelchair does not have freedom of movement.

(C) Since the large wheels of the wheelchair protrude sideways from the chair body, the large wheels may prevent the wheelchair from passing through a narrow space within a building, etc.

(D) Since the wheelchair is collapsible by folding the right and left sides of the chair body toward the inside, the seat and back of the chair body are made of a cloth or comprise a right and left pair of plates connected with one another so as to be collapsible. Therefore, the wheelchair is not comfortable to sit in.

(E) Since the large wheels of the wheelchair are not adapted to turn in different horizontal directions, the wheelchair cannot move sideways or obliquely.

BRIEF SUMMARY OF THE INVENTION

It is therefore an object of the invention to provide a wheelchair, which has obviated all of the above-mentioned disadvantages of the conventional wheelchair.

It is another object of the invention to provide a wheelchair, which makes it possible for the user to move from the wheelchair to the bed, etc. or from the bed, etc. to the wheelchair without lifting himself and getting up on his feet.

It is a further object of the invention to provide a wheelchair, which can move across a small difference in floor height, a small projection, a small hole or any other small obstacle on the floor.

It is a still further object of the invention to provide a wheelchair, which can pass through a narrow space within a building, etc.

It is a still further object of the invention to provide a wheelchair, which is comfortable to sit in.

It is a still further object of the invention to provide a wheelchair, which can move sideways and obliquely.

These and other objects have been attained by the following wheelchairs.

First, the present invention is a wheelchair comprising a chair body with a seat and armrests, right and left large wheels provided on right and left sides of said chair body, right and left front casters provided in front of said chair body, each of said front casters being adapted to turn in different horizontal directions > wherein said chair body is provided at the rear thereof with right and left rear casters, each of said rear casters being adapted to turn in different horizontal directions, the position of each of said rear casters being vertically.

In this wheelchair, each of the rear casters is usually adjusted so that a lower end thereof is higher than a lower end of each of the large wheels. In this case, the rear casters do not contact the floor or the ground. Only the large wheels and the front casters contact the floor or the ground. Therefore, the wheelchair is used in the same manner as the conventional wheelchair.

If each of the rear casters is adjusted so that the lower end thereof is lower than the lower end of each of the large wheels, then the large wheels do not contact the floor or the ground. In other words, the wheelchair is supported only by the front casters and the rear casters. See FIGS. 1 and 2. Since both the front casters and the rear casters are adapted to turn in different horizontal directions, the wheelchair can move sideways and obliquely.

Second, the present invention is a wheelchair in which the position of each of said large wheels is adjustable forward and backward.

It is possible to adjust each of the large wheels to a position corresponding to the center of gravity of the wheelchair between the front casters and the rear casters. It is also possible to move each of the large wheels to a position in the rear of each rear caster. In either case, when the position of each of the large wheels is adjusted forward or backward, it is necessary to make the lower end of each rear caster lower than the lower end of each large wheel so that the large wheels do not contact the floor or the ground.

If each of the large wheels is adjusted to a position corresponding to the center of gravity of the wheelchair between the front casters and the rear casters and each of the rear casters is adjusted so that the lower end of each rear caster is higher than the lower end of each large wheel, then the wheelchair can be tilted forward and backward with the large wheels on the floor or the ground. When the wheelchair is tilted backward, the front casters are above the floor or the ground. When the wheelchair is tilted forward, the rear casters are above the floor or the ground. By tilting the wheelchair forward and backward in this way, the wheelchair can cross an obstacle on the floor or the ground. See FIG. 7.

Third, the present invention is a wheelchair in which each of said large wheels is attached to a horizontal supporting member, the position of said horizontal supporting member being adjustable forward and backward.

In order that the position of each of the large wheels is adjustable forward and backward, each of the large wheels is attached to a horizontal supporting member, the position of which member is adjustable forward and backward. Each of the large wheels moves forward and backward when each of the horizontal supporting members moves forward and backward.

Fourth, the present invention is a wheelchair in which each of said horizontal supporting members can be folded toward the inside of the wheelchair, and the diameter of each of said large wheels does not exceed the width of said chair body.

It is possible to fold each of the large wheels at the back of the chair body by moving each of the horizontal supporting members backward so that each of the large wheels is in the rear of the rear edge of the chair body and then bending each of the horizontal supporting members toward the inside of the wheelchair. When the large wheels are folded in this manner, the axles thereof are in a longitudinal direction. See FIGS. 4 and 5. Since one of the large wheels is folded and then another large wheel is folded at the back of said one of the large wheels, the horizontal supporting member for said another large wheel has a bending portion at a position in the rear of a bending portion of the horizontal supporting member for said one of the large wheels. See FIG. 3 and 4.

Since the diameter of each of the large wheels does not exceed the width of the chair body, each of the large wheels folded at the back of the chair body does not protrude sideways from the chair body. Usually each of the large wheels protrudes sideways from the chair body. Therefore, when each of the large wheels is folded at the back of the chair body, the overall width of the wheelchair becomes smaller. Thus, the problem that the large wheels prevent the wheelchair from passing through a narrow space within a building, etc. is solved. When the large wheels are folded at the back of the chair body, the user of the wheelchair cannot move the wheelchair by rotating the large wheels. In this case, the user of the wheelchair has to move the wheelchair by laying hands on a handrail, etc. or have a helper move the wheelchair.

Fifth, the present invention is a wheelchair in which said armrests are pivotally attached to right and left sides of said chair body so as to turn forward and backward.

When the large wheels are folded at the back of the chair body and the armrests are turned backward, the seat of the wheel chair is open sideways and has no obstacle sideways. See FIG. 5. Therefore, the user of the wheelchair can move from the wheelchair to the bed, etc. or from the bed, etc. to the wheelchair by sliding sideways. In other words, the user of the wheelchair does not have to lift himself and get up on his feet in order to move between the wheelchair and the bed, etc.

Sixth, the present invention is a wheelchair in which said chair body is collapsible backward.

When the large wheels are folded at the back of the chair body and the chair body is collapsed backward, the wheelchair becomes thin and compact. Since the seat and the back of the chair body are not folded, the seat and the back can be made of materials having a satisfactory cushioning effect.

DETAILED DESCRIPTION OF THE INVENTION

Figure 1:
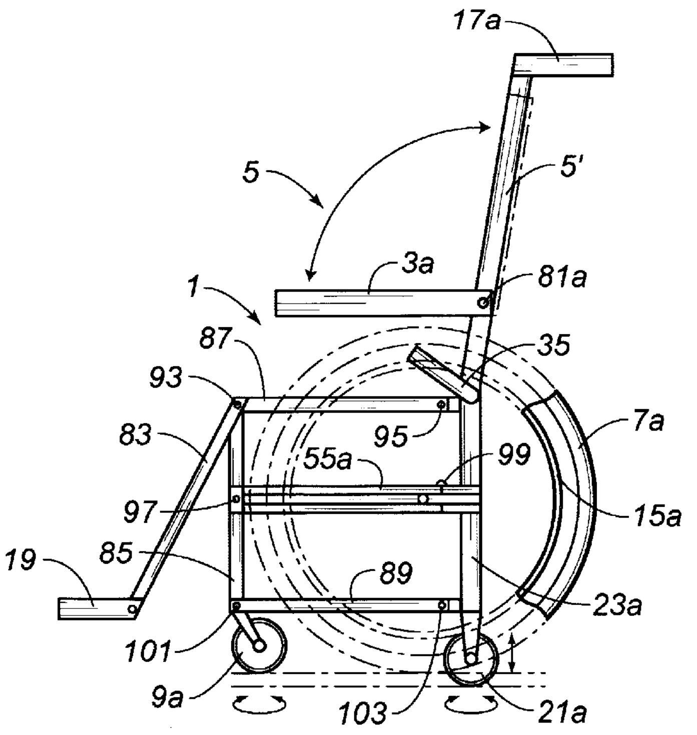
FIG. 1 is a side plan view showing a wheelchair in which each of rear casters is adjusted so that the lower end thereof is lower than the lower end of each of large wheels.

The present invention will now be described in detail with reference to the attached drawings.

A wheelchair according to the present invention is the same as the conventional wheelchair in the following points.

The wheelchair according to the present invention comprises a chair body 5 with a seat 1 and armrests 3*a*, 3*b*, right and left large wheels 7*a*, 7*b* provided on right and left sides of the chair body 5, right and left front casters 9*a*, 9*b* provided in front of the chair body 5, each of the front casters 9*a*, 9*b* being adapted to turn in different horizontal directions.

Each of said front casters 9*a*, 9*b* is disposed under the chair body 5 so as not to protrude sideways from the chair body 5. The seat 1 has a seat upholstery 11 and a back upholstery 13. The large wheels 7*a*, 7*b* respectively have push rims 15*a*, 15*b*, by means of which the user of the wheelchair rotates the large wheels 7*a*, 7*b* by hand. Reference symbols 17*a* and 17*b* represent a handgrip, by means of which the helper pushes the wheelchair by hand. Reference symbol 19 represents a footrest.

The wheelchair according to the present invention is different from the conventional wheelchair in the following points:

Said chair body 5 is provided at the rear thereof with right and left rear casters 21*a*, 21*b*, each of said rear casters 21*a*, 21*b* being adapted to turn in different horizontal directions, the position of each of said rear casters 21*a*, 21*b* being vertically adjustable. Each of said rear casters 21*a*, 21*b* is disposed under the chair body 5 so as not to protrude sideways from the chair body 5.

Figure 8:
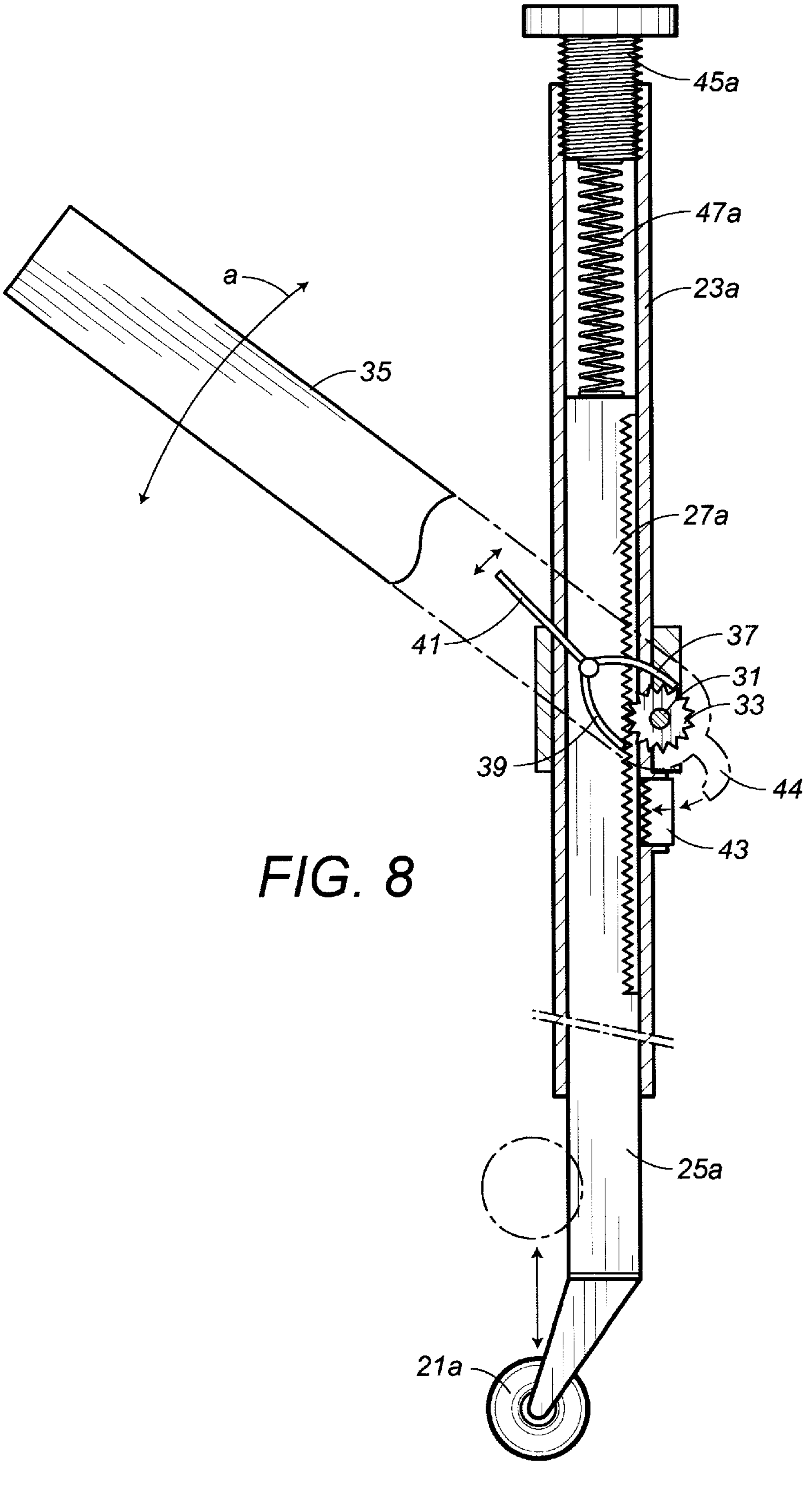
FIG. 8 is a sectional view showing a vertical movement means for adjusting the height of a rear caster.
Figure 9:
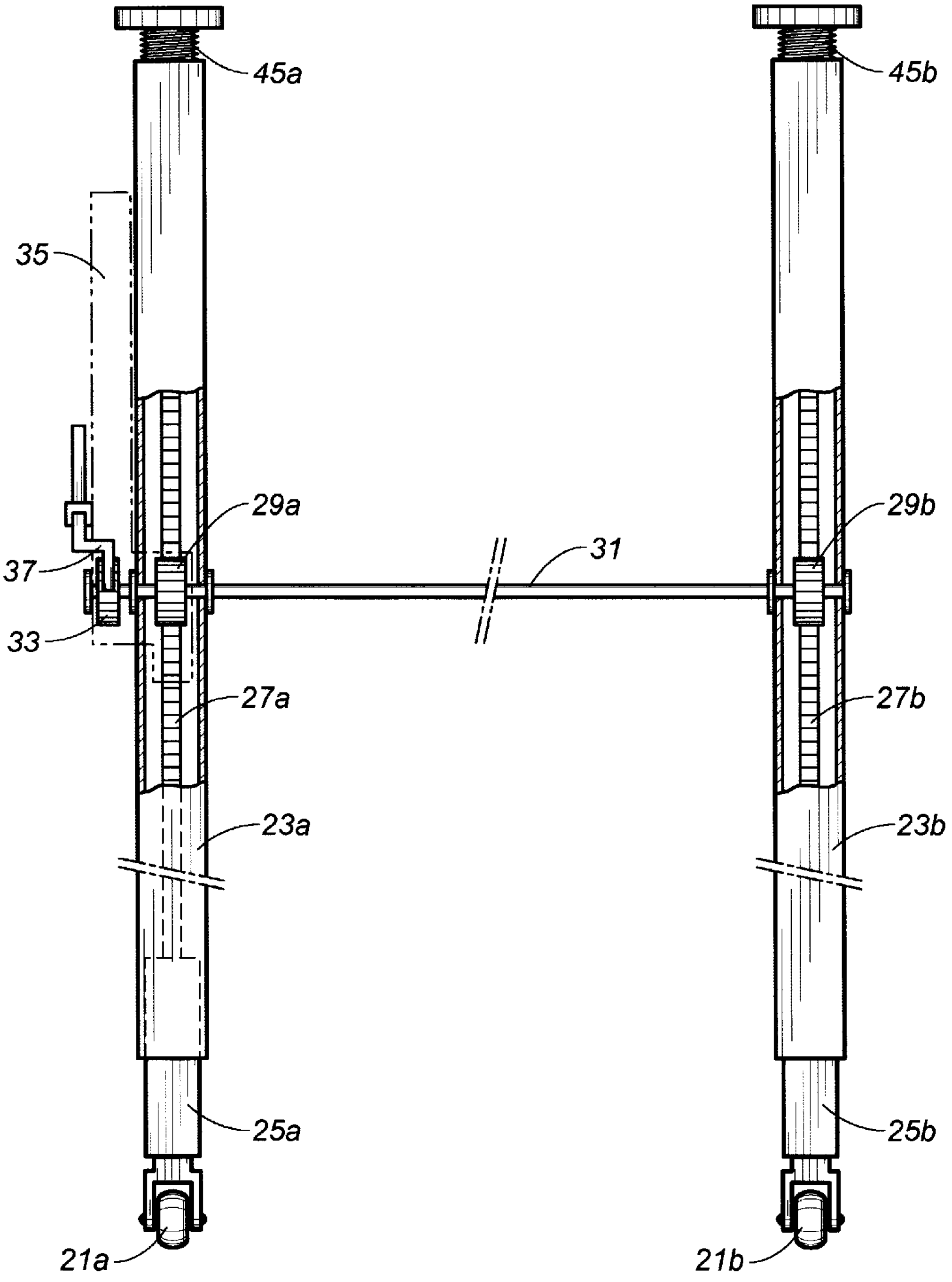
FIG. 9 is a rear sectional view of said vertical movement means.

FIGS. 8 and 9 show a vertical movement means for adjusting the height of rear casters 21*a*, 21*b*.

Vertical supporting sleeves 23*a*, 23*b* are attached to the chair body 5. The vertical supporting sleeve 23*a* is for the rear caster 21*a*. The vertical supporting sleeve 23*b* is for the rear caster 21*b*. The rear casters 21*a*, 21*b* are respectively attached to a lower end of the vertical supporting members 25*a*, 25*b* which are disposed vertically movably within the vertical supporting sleeves 23*a*, 23*b*.

The vertical supporting members 25*a*, 25*b* respectively have racks 27*a*, 27*b*. The racks 27*a*, 27*b* are respectively engaged with pinions 29*a*, 29*b*. These pinions 29*a*, 29*b* are connected with one another by means of a connecting shaft 31. Thus, the pinions 29*a*, 29*b* rotate always in the same direction and at the same speed.

A ratchet wheel 33 is fixed to the connecting shaft 31. An operation lever 35 is rotatably attached to the connecting shaft 31. A two-forked pawl 41 having two engagement portions 37, 39 is swingably attached to the operation lever 35 so that either of the two engagement portions 37, 39 is selectively engaged with the ratchet wheel 33. By turning the operation lever 35 forward and backward repeatedly, the ratchet wheel 33 is rotated in one direction through one of the two engagement portions 37, 39 of the pawl 41. The direction of rotation of the ratchet wheel 33 depends upon which of the two engagement portions 37, 39 of the pawl 41 is engaged with the ratchet wheel 33. The ratchet gearing may be attached to only one of the two vertical supporting sleeves 23*a*, 23*b*.

The vertical supporting sleeve 23*a* is provided with a locking member 43 which is disengageably engaged with the rack 27*a* so as to lock the rack 27*a*. The operation lever 35 is provided at an end thereof with a pushing portion 44 which pushes the locking member 43 so as to engage the locking member 44 with the rack 27*a*. In FIG. 8, the pushing portion 44 engages the locking member 43 with the rack 27*a* when the operation lever 35 is turned to a vertical position.

Adjusting screws 45*a*, 45*b* are respectively in threaded engagement with an upper end of the vertical supporting sleeves 23*a*, 23*b*. Springs 47*a*, 47*b* (Only 47*a* is shown.) are respectively disposed between a lower end of the adjusting screws 45*a*, 45*b* and an upper end of the vertical supporting members 25*a*, 25*b* so as to push the vertical supporting members 25*a*, 25*b* downward. The springs 47*a*, 47*b* prevent the vertical supporting members 25*a*, 25*b* from rapidly moving up relative to the vertical supporting sleeves 23*a* , 23*b* in case of an engagement error between the ratchet wheel 33 and the pawl 41. In other words, the springs 47*a*, 47*b* prevent the vertical supporting sleeves 23*a*, 23*b* from rapidly moving down to prevent the wheelchair from falling down. The vertical position of the rear casters 21*a*, 21*b* varies according to the weight of the wheelchair user and the force of the springs 47*a*, 47*b*. The force of the springs 47*a*, 47*b* is adjusted by means of the adjusting screws 45*a*, 45*b* according to the weight of the wheelchair user.

When the rear casters 21*a*, 21*b* are to be moved upward by the vertical movement means shown in FIGS. 8 and 9, the engagement portion 37 of the pawl 41 is engaged with ratchet wheel 33 and the operation lever 35 is turned forward and backward repeatedly as shown by an arrow "a" in FIG. 8. Then, the engagement portion 37 of the pawl 41 rotates the ratchet wheel 33 clockwise in FIG. 8. At this time, the engagement portion 37 does not allow the ratchet wheel 33 to rotate counterclockwise. When the ratchet wheel 33 rotates clockwise, the rotation of the ratchet wheel 33 is transmitted through the connecting shaft 31 to the pinions 29*a*, 29*b*, and the pinions 29*a*, 29*b* are rotated clockwise. Then, the racks 27*a*, 27*b* engaged with the pinions 29*a*, 29*b* are moved upward against the force of the springs 47*a*, 47*b* and move the rear casters 21*a*, 21*b* upward.

When the rear casters 21*a*, 21*b* are to be moved downward by the vertical movement means shown in FIGS. 8 and 9, the other engagement portion 39 of the pawl 41 is engaged with ratchet wheel 33 and the operation lever 35 is turned forward and backward repeatedly as shown by the arrow "a" in FIG. 8. Then, the engagement portion 39 of the pawl 41 rotates the ratchet wheel 33 counterclockwise in FIG. 8. At this time, the engagement portion 39 does not allow the ratchet wheel 33 to rotate clockwise. When the ratchet wheel 33 rotates counterclockwise, the rotation of the ratchet wheel 33 is transmitted through the connecting shaft 31 to the pinions 29*a*, 29*b*, and the pinions 29*a*, 29*b* are rotated counterclockwise. Then, the racks 27*a*, 27*b* engaged with the pinions 29*a*, 29*b* are moved downward and move the rear casters 21*a*, 21*b* downward.

Figure 2:
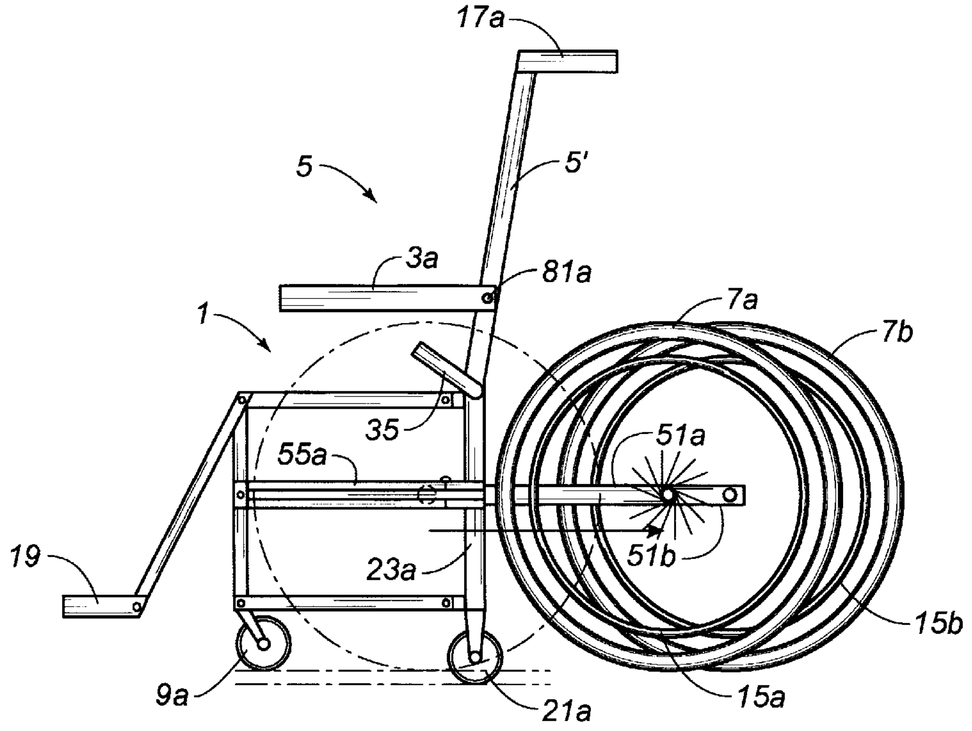
FIG. 2 is a side plan view showing said wheelchair in which each of said large wheels is positioned in the rear of the rear end of a chair body.
Figure 7:
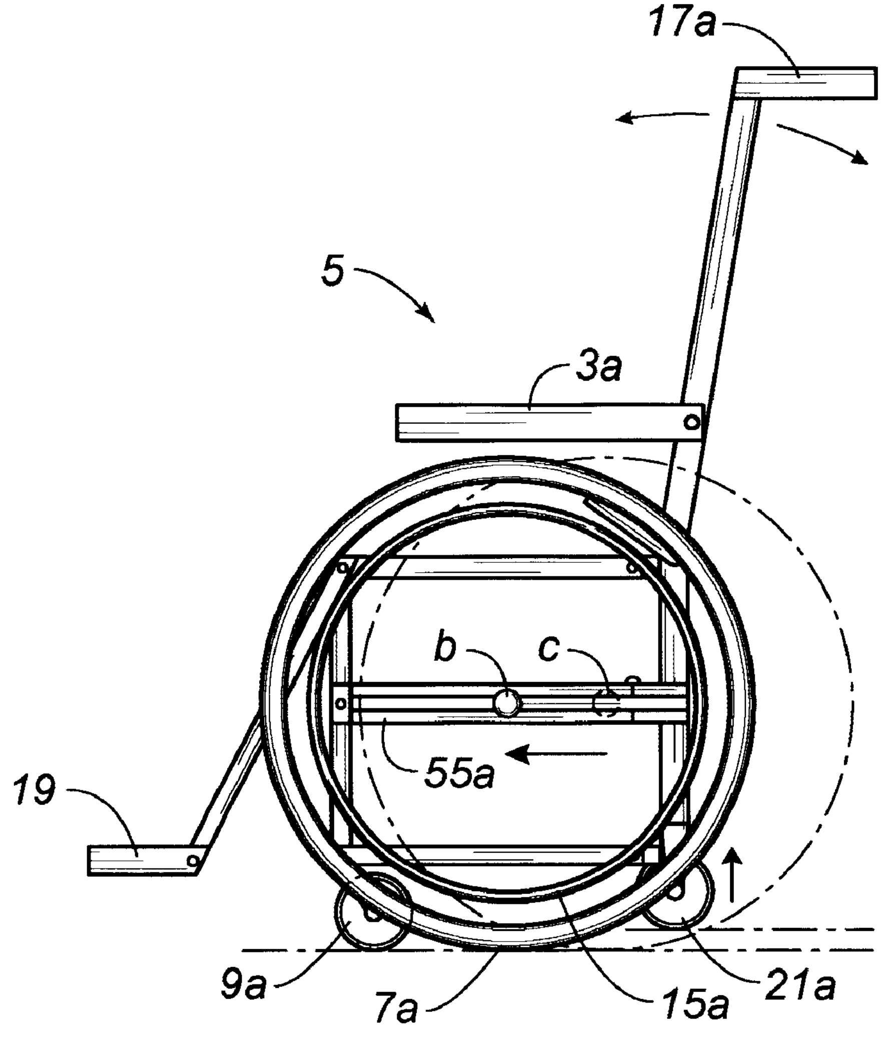
FIG. 7 is a side plan view showing the wheelchair tilted forward and backward with the large wheels on the floor or the ground.

The position of each of said large wheels 7*a*, 7*b* is adjustable forward and backward. It is possible to adjust each of the large wheels 7*a*, 7*b* to a position corresponding to the center of gravity (reference symbol "b" in FIG. 7) of the wheelchair between the front casters 9*a*, 9*b* and the rear casters 21*a*, 21*b*. It is also possible to move each of the large wheels 7*a*, 7*b* to a position in the rear of the rear casters 21*a*, 21*b* (FIG. 2). Reference symbol "c" in FIG. 7 shows a normal position of each of the large wheels 7*a*, 7*b*.

Said large wheels 7*a*, 7*b* are respectively attached to horizontal supporting members 51*a*, 51*b*, the position of said horizontal supporting members 51*a*, 51*b* being adjustable forward and backward.

Figure 4:
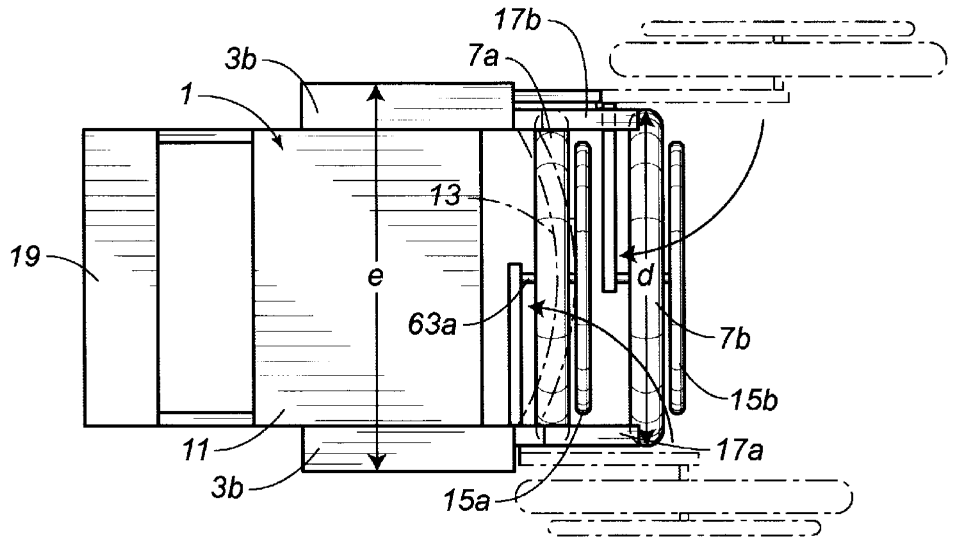
FIG. 4 is a plan view showing said wheelchair in which each of said large wheels is folded at the back of the chair body.
Figure 5:
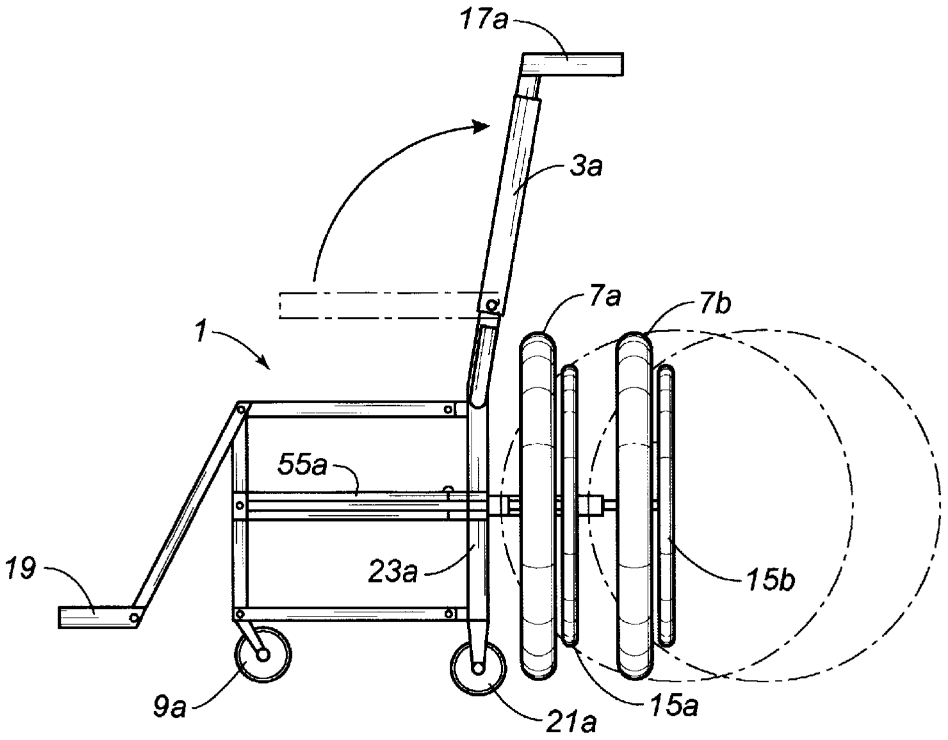
FIG. 5 is a side plan view of the same.

Each of said horizontal supporting members 51*a*, 51*b* can be folded toward the inside of the wheelchair, and the diameter (reference symbol "d" in FIG. 4) of each of said large wheels 7*a*, 7*b* does not exceed the width (reference symbol "e" in FIG. 4) of said chair body 5.

Figure 10:
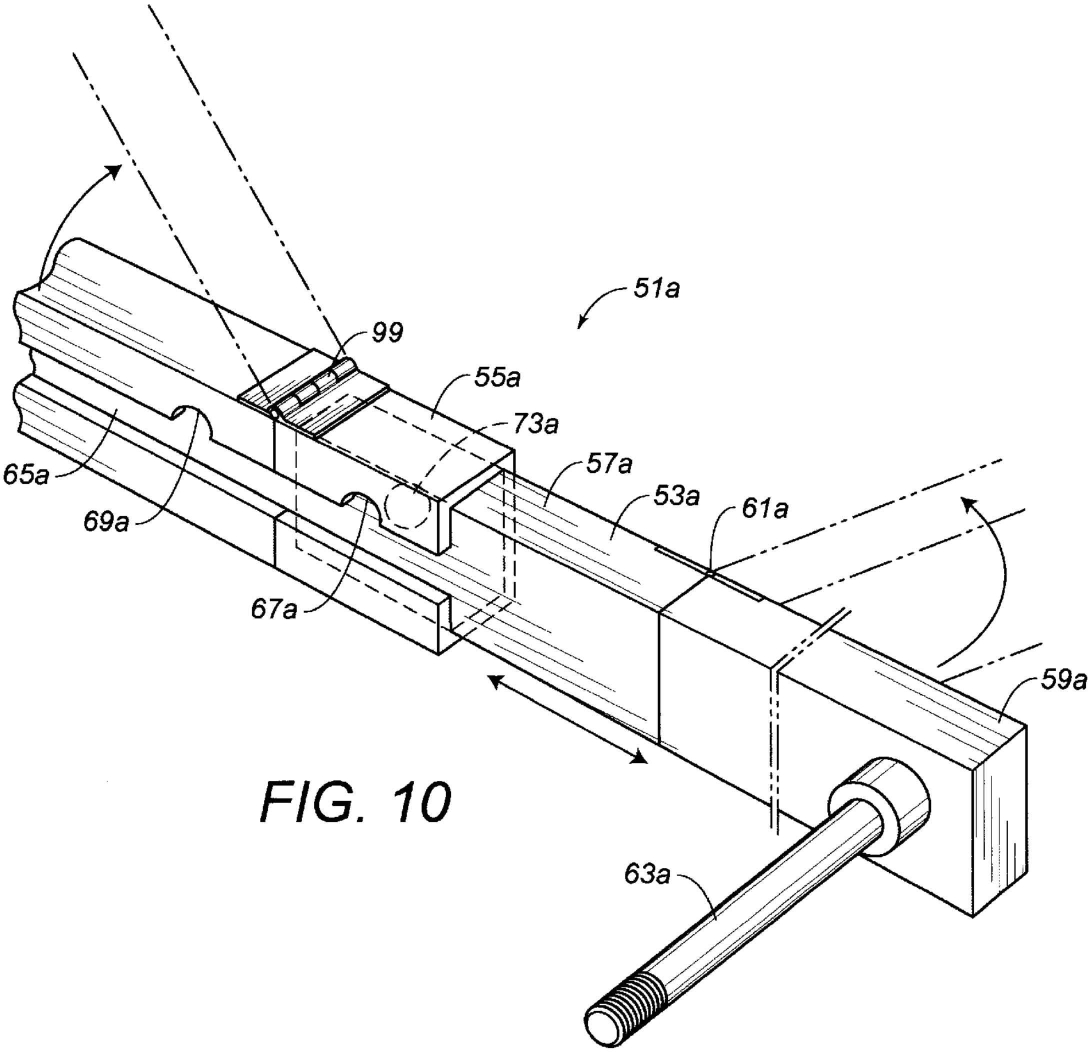
FIG. 10 is a perspective view of a horizontal supporting member.
Figure 11:
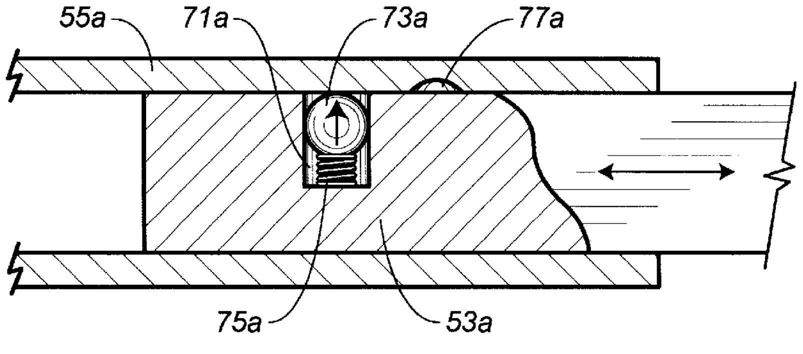
FIG. 11 is a sectional view of a locking means in said horizontal supporting member.

FIGS. 10 and 11 show an example of the horizontal supporting member 61*a*. This horizontal supporting member 51*a* comprises a horizontal supporting body 53*a* and a horizontal supporting sleeve 55*a*, said horizontal supporting body 53*a* being slidably inserted into said horizontal supporting sleeve 55*a*. The horizontal supporting body 53*a* comprises a front portion 57*a* and a rear portion 59*a*, said rear portion 59*a* being connected to said front portion 57*a* by means of a hinge 61*a* so that said rear portion 59*a* can be folded toward the inside (See FIG. 4.) of the wheelchair. The rear portion 59*a* of the horizontal supporting body 53*a* has an axle 63*a* of the large wheel 7*a*. The horizontal supporting sleeve 55*a* has an opening 65*a*, through which the axle 63*a* of the large wheel 7*a* passes.

The horizontal supporting sleeve 55*a* is provided on an upper edge of the opening 65*a* with a plurality of notches 67*a*, 69*a* . . . for locking the axle 63*a* of the large wheel 7*a*. When the axle 63*a* of the large wheel 7*a* is fitted in the notch 67*a*, the large wheel 7*a* is locked in the above-mentioned normal position (reference "c" in FIG. 7). When the axle 63*a* of the large wheel 7*a* is fitted in the notch 69*a*, the large wheel 7*a* is locked in the above-mentioned position corresponding to the center of gravity (reference symbol "b" in FIG. 7) of the wheelchair between the front caster 9*a* and the rear caster 21*a*.

The horizontal supporting member 51*a* shown in FIGS. 10 and 11 has a means for locking the horizontal supporting body 53*a* to the horizontal supporting sleeve 55*a*. The locking means comprises a ball hole 71*a* formed in the horizontal supporting body 53*a*, a ball 73*a* disposed in the ball hole 71*a* so that said ball 73*a* can freely come in and out, said ball 73*a* being always pushed outward by a spring 75*a*, a concave 77*a* formed in an inner surface of the horizontal supporting sleeve 55*a*, said concave 77*a* being adapted to receive said ball 71*a*. When the ball 73*a* is caught in the concave 77*a*, the horizontal supporting body 53*a* is locked to the horizontal supporting sleeve 55*a*. If the horizontal supporting body 53*a* is moved in a horizontal direction by a force exceeding a certain value, then the ball 73*a* caught in the concave 77*a* sinks into the ball hole 71*a* against the force of the spring 75*a* to unlock the horizontal supporting body 53*a*.

Figure 3:
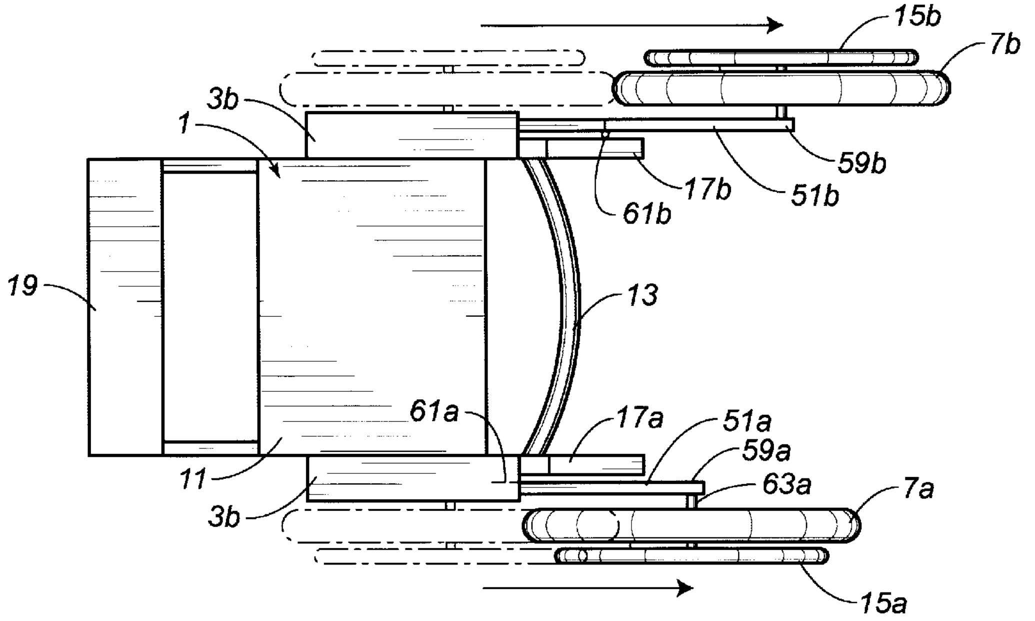
FIG. 3 is a plan view of the same.

Another horizontal supporting member 51*b* is substantially the same as said horizontal supporting member 5l*a*. However, when the large wheels 7*a*, 7*b* are folded at the back of the chair body 5, first one large wheel 7*a* is folded and then another large wheel 7*b* is folded at the back of said one large wheel 7*a*. Therefore, the bending portion (hinge 61*b* ) of the horizontal supporting member 51*b* for said another large wheel 7*b* is in the rear of the bending portion (hinge 61a) of the horizontal supporting member 51a for said one large wheel 7a. See FIG. 3.

Said armrests 3a, 3b are pivotally attached to right and left sides 5' of said chair body 5 so as to turn forward and backward. For example, the armrests 3a, 3b are respectively attached to the right and left sides 5' of the chair body 5 by means of a pivot 81a.

Figure 6:
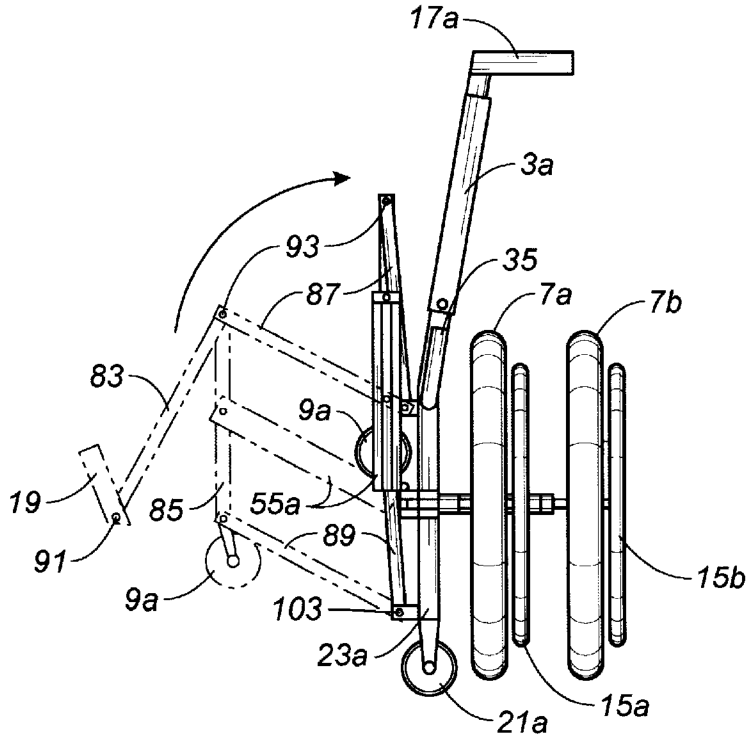
FIG. 6 is a side plan view of said wheelchair in which the chair body is collapsed backward.

The chair body 5 is collapsible backward. Component members 19 (footrest), 83, 85, 87, 55a (horizontal supporting sleeve), 55b (horizontal supporting sleeve), and 89 of the chair body 5 are respectively adapted to turn forward and backward by means of pivots or hinges 91, 93, 95, 97, 99, 101 and 103. After the large wheels 7a, 7b are folded at the back of the chair body 5, the chair body 5 can be folded backward as shown in FIG. 6. The folded chair body 5 can be easily unfolded.

The present invention has the following advantages:

The present invention is a wheelchair in which said chair body is provided at the rear thereof with right and left rear casters, each of said rear casters being adapted to turn in different horizontal directions, the position of each of said rear casters being vertically adjustable.

If each of the rear casters is adjusted so that the lower end thereof is lower than the lower end of each of the large wheels, then the large wheels do not contact the floor or the ground. In other words, the wheelchair is supported only by the front casters and the rear casters. Since both the front casters and the rear casters are adapted to turn in different horizontal directions, the wheelchair can move sideways and obliquely.

The present invention is a wheelchair in which the position of each of said large wheels is adjustable forward and backward.

If each of the large wheels is adjusted to a position corresponding to the center of gravity of the wheelchair between the front casters and the rear casters and each of the rear casters is adjusted so that the lower end of each rear caster is higher than the lower end of each large wheel, then the wheelchair can be tilted forward and backward with the large wheels on the floor or the ground. Therefore, the wheelchair can cross an obstacle on the floor or the ground.

The present invention is a wheelchair in which each of said large wheels is attached to a horizontal supporting member, the position of said horizontal supporting member being adjustable forward and backward.

Each of the large wheels moves forward and backward when each of the horizontal supporting members moves forward and backward.

The present invention is a wheelchair in which each of said horizontal supporting members can be folded toward the inside of the wheelchair, and the diameter of each of said large wheels does not exceed the width of said chair body.

It is possible to fold each of the large wheels at the back of the chair body by moving each of the horizontal supporting members backward so that each of the large wheels is in the rear of the rear edge of the chair body and then bending each of the horizontal supporting members toward the inside of the wheelchair. Since the diameter of each of the large wheels does not exceed the width of the chair body, each of the large wheels folded at the back of the chair body does not protrude sideways from the chair body. Usually each of the large wheels protrudes sideways from the chair body. Therefore, when each of the large wheels is folded at the back of the chair body, the overall width of the wheelchair becomes smaller. Thus, the problem that the large wheels prevent the wheelchair from passing through a narrow space within a building, etc. is solved.

The present invention is a wheelchair in which said armrests are pivotally attached to right and left sides of said chair body so as to turn forward and backward.

When the large wheels are folded at the back of the chair body and the armrests are turned backward, the seat of the wheel chair is open sideways and has no obstacle sideways. Therefore, the user of the wheelchair can move from the wheelchair to the bed, etc. or from the bed, etc. to the wheelchair by sliding sideways. Therefore, the burden imposed both on the user of the wheelchair and on a person who helps him is remarkably reduced.

The present invention is a wheelchair in which said chair body is collapsible backward.

When the large wheels are folded at the back of the chair body and the chair body is collapsed backward, the wheelchair becomes thin and compact. Since the seat and the back of the chair body are not folded, the seat and the back can be made of materials having a satisfactory cushioning effect.

As many apparently widely different embodiments of the present invention may be made without departing from the spirit and scope thereof, it is to be understood that the invention is not limited to the specific embodiments thereof except as defined in the appended claims.

I claim:

1. A wheelchair comprising:

- a chair body having a seat and armrests on opposite sides of said seat, said chair body having a width;
- a right large wheel connected to a right side of said chair body;
- a left large wheel connected to a left side of said chair body, said right and left large wheels being adjustable forwardly and rearwardly relative to said chair body, each of said right and left large wheels being attached to a horizontal supporting member, said horizontal supporting member being adjustable forwardly and rearwardly, each of the horizontal members being foldable inside of said chair body, each of said right acid left large wheels having a diameter no more than said width of said chair body;
- a right front caster connected to a front of said chair body;
- a left front caster connected to said front of said chair, each of said right and left front casters being adapted to turn in different horizontal directions;
- a right rear caster connected to a rear of said chair body; and
- a left rear caster connected to said rear of said chair body, each of said right and left rear casters being adapted to turn in different horizontal directions, each of said right and left rear casters having a position which is vertically adjustable.

2. The wheelchair of claim 1, wherein said armrests are pivotally attached respectively to said right and left sides of said chair body so as to turn forwardly and backwardly.

3. The wheelchair of claim 2, wherein said chair is collapsible backwardly.

* * * * *